United States Patent [19]

Kosaka et al.

[11] 3,980,735

[45] Sept. 14, 1976

[54] HOT MELT ADHESIVE COMPOSITION

[75] Inventors: Yujiro Kosaka; Noriaki Emura; Syuzo Watanabe, all of Shin-nanyo, Japan

[73] Assignee: Toyo Soda Manufacturing Co., Ltd., Shin-nanyo, Japan

[22] Filed: Mar. 24, 1975

[21] Appl. No.: 561,417

[30] Foreign Application Priority Data

June 11, 1974 Japan................................ 49-65607

[52] U.S. Cl............................... 260/873; 428/458; 428/461
[51] Int. Cl.$^2$.......................................... C08L 67/06
[58] Field of Search ............. 260/873; 428/458, 461

[56] References Cited
UNITED STATES PATENTS 3,111,500    11/1963    Bartl et al............................ 260/873

*Primary Examiner*—J. Ziegler
*Attorney, Agent, or Firm*—Oblon, Fisher, Spivak, McClelland & Maier

[57] ABSTRACT

A hot melt adhesive composition, which comprises: a modified ethylene-vinyl acetate copolymer produced by heating a mixture of 99.7 – 20 parts by wt. of an ethylene-vinyl acetate copolymer having a vinyl content of 5 – 50 wt. % and a melt index of 1 – 400 g/10 min., 0.3 – 80 parts by wt. of an unsaturated alkyd resin produced by esterification of an unsaturated acid and a polyhydric alcohol and 0.05 – 5 parts by wt. of an organic peroxide.

6 Claims, No Drawings

HOT MELT ADHESIVE COMPOSITION

BACKGROUND OF THE INVENTION

1. Field of the Invention

The present invention relates to a hot melt adhesive composition which has excellent low temperature hot melting properties and which can be easily formed into pellets, powders, films, and laminates.

2. Description of the Prior Art

Various hot melt adhesive compositions have been used in various applications, and adhesive compositions containing an ethylene-vinyl acetate copolymer as the main component have been especially and widely used in various applications. These hot melt adhesive compositions usually contain rosin, a modified rosin, an aromatic petroleum resin, and the like as tackifiers for the ethylene-vinyl acetate copolymer in order to improve the adhesive properties of the copolymer. However, even though tackifiers have been added to the copolymers, it has been difficult to obtain products having substantially high adhesive properties. Accordingly, it has been necessary to add a large amount of the tackifier to improve the adhesive properties of the conventional adhesive compositions. Consequently, the characteristic broad processability of the ethylene-vinyl acetate copolymers has been lost and the applications of the conventional adhesive compositions have been limited. For example, it has been difficult to shape the adhesive composition into a film or laminated layer.

A need, therefore, continues to exist for an ethylene-vinyl acetate adhesive composition which has substantial adhesive properties and which can be shaped into films or laminated layers.

SUMMARY OF THE INVENTION

Accordingly, one object of the present invention is to provide a hot melt adhesive composition which adheres to substrates at relatively low temperatures.

Another object of the invention is to provide a hot melt adhesive composition which can be shaped into pellets and formed into powders, films and laminated layers.

Yet another object of the invention is to provide a hot melt adhesive composition which can be used in the bonding of a metal and another material into a laminate.

Briefly, these and other objects of the invention, as hereinafter will become more readily apparent, can be obtained by a hot melt adhesive composition of a modified ethylene-vinyl acetate copolymer prepared by reacting an ethylene-vinyl acetate copolymer, an unsaturated alkyd resin and an organic peroxide. The resulting adhesive exhibits excellent adhesive properties when used in only small amounts compared to those compositions which contain a tackifier. The adhesive composition of this invention can be used in various shapes such as pellets, powders, films and laminated layers. The hot melt adhesive composition comprises a modified ethylene-vinyl acetate copolymer prepared by heating a mixture of 99.7 – 20 parts by wt., preferably 99.5 – 80 parts by wt. of an ethylene-vinyl acetate copolymer having a vinyl acetate content of 5 – 50 wt. % and a melt index of 1 – 400 g/10 min., 0.3 – 80 parts by wt., preferably 0.5 – 20 parts by wt. of an unsaturated alkyd resin prepared by esterification of an unsaturated acid, a saturated acid and polyhydric alcohol; and 0.05 – 5 parts by wt., preferably 0.05 – 1 part by wt. of an organic peroxide.

DETAILED DESCRIPTION OF THE PREFERRED EMBODIMENTS

The ethylene-vinyl acetate copolymers used in the present invention have a vinyl acetate content of 5 – 50 wt. %, preferably 10 – 40 wt. %, and a melt index of 1 –400 g/10 min, preferably 10 – 200 g/10 min. When copolymers are used having a low vinyl acetate content, the adhesive properties are low and the blocking properties are low so that it is easily handled. When a copolymer having a high vinyl acetate content is used, it is difficult to use the composition in the form of a film. However, the composition can be used in applications for which substituted adhesive properties are required except when used in the formation of films. The desired ethylene-vinyl acetate copolymer having a certain vinyl acetate content is selected depending upon the application required.

The unsaturated alkyd resins used in the present invention can be prepared by any conventional process by heating a mixture of an $\alpha, \beta$-unsaturated dicarboxylic acid and a polyhydric alcohol if desired with a saturated dicarboxylic acid (dicarboxylic acids include dicarboxylic anhydrides) at 80° – 250°C under an inert gas to condense the reactants. Thereafter, water is removed by evaporation from the reaction system and the temperature increases depending upon the progress of the condensation reaction. In the unsaturated alkyd resins, the unsaturated acid component is 100 – 10 mole %, preferably 80 – 30 mole % of the total dicarboxylic acid. The polyhydric alcohol is added in equivalent amounts or in amounts in excess up to 20 mole % of the total acid component. When an unsaturated alkyd resin having a high unsaturated acid content is used, it is necessary to be careful of the formation of a partial net structure in the reaction with the ethylene-vinyl acetate copolymer. However, substantial adhesive properties can be imparted to the adhesive by adding a small amount of the resin. When an unsaturated alkyd resin having a low unsaturated acid content is used, the formation of a net structure is minor and the production of the adhesive composition is easy. However, relatively large amounts of the resin should be added to the composition.

It is preferable to use an unsaturated alkyd resin having a number average molecular weight of 500 – 5000, preferably 500 – 3000 which is calculated upon the basis of the terminal acid groups and the terminal hydroxyl groups, from the viewpoint of blooming. Suitable unsaturated acids include maleic anhydride, fumaric acid, itaconic acid and the like, and the saturated acids include phthalic anhydride, isophthalic acid, terephthalic acid, tetrahydrophthalic anhydride, tetrachlorophthalic anhydride, adipic acid, sebacic acid, and the like. Suitable polyhydric alcohols include ethyleneglycol, diethyleneglycol, propyleneglycol, dipropyleneglycol, butyleneglycol, hydrogenated bisphenol, and the like. Suitable organic peroxides used in the invention include initiators for conventional radical polymerization reactions such as benzoyl-peroxide, lauroyl peroxide, di-t-butyl peroxide, t-butyl perbenzoate or dicumyl peroxide, and the like.

Excellent adhesive properties can be imparted to the composition by selecting an organic peroxide from the viewpoint of the temperature of preparation, processing operation and the adherence of the composition.

For example, in order to produce an adhesive composition having a low melt viscosity and high adhesive properties at relatively low temperature, an ethylene-vinyl acetate copolymer having a high melt index and a high vinyl acetate content and an organic peroxide having a relatively low decomposition temperature such as lauroyl peroxide or benzoyl peroxide are selected. It is believed that the adhesive composition of the invention contains the unsaturated alkyd resin which is chemically bonded to the ethylene-vinyl acetate copolymer and is free of unsaturated alkyd resin. It is also believed that the organic peroxide causes a reaction of the chemically reactive bonds of an unsaturated alkyd resin // unsaturated alkyd resin combination, an unsaturated alkyd//ethylene-vinyl acetate copolymer combination and an ethylene-vinyl acetate copolymer //ethylene-vinyl acetate copolymer combination. Further, the organic peroxide affects the unsaturated alkyd resin and ethylene-vinyl acetate copolymer, and a composition having highly adhesive properties is obtained.

In the adhesive composition of the invention, only the organic peroxide and the antioxidant are low molecular weight compounds, and consequently, the composition does not have the disadvantage of having a bad smell at high temperatures and blooming is not found. The adhesive composition of the present invention has substantial adhesive properties, even though the added amount of unsaturated alkyd resin is small. Accordingly, the melt properties and mechanical properties of the adhesive composition are similar to those of the main component of the ethylene-vinyl acetate copolymer. The adhesive composition can be shaped into pellets, powders, forms, and laminated layers for use in various applications by selecting the desired ethylene-vinyl acetate copolymer. For example, an embodiment for the preparation of the adhesive composition is as follows. An ethylene-vinyl acetate copolymer, an unsaturated alkyd resin and the organic peroxide are mixed in desired amounts and the mixture is heated at a temperature higher than the decomposition temperature of the organic peroxide (10 hours half value period) and reacted in an extruder, open roller mill or Bumbury's mixer, or the like to produce the modified ethylene-vinyl acetate copolymer. If desired, an additional ethylene-vinyl acetate copolymer, an antioxidant, a slip agent and a tackifier can be added to the modified ethylene-vinyl acetate copolymer, and the mixture is mixed and pelletized in an extruder. The pellet adhesive composition can be shaped into a film form or laminated into various substrates by an inflation process, a T-die process, a calender process or a pressing process or the like, depending upon the purpose of the application.

The adhesive properties of the adhesive composition of the invention compared to a conventional adhesive is shown as follows. The peeling strength of a laminated aluminum plate bonded with a commercial adhesive composition of an ethylene-vinyl acetate copolymer having a vinyl acetate content of 27 wt. % and melt index of 17 g/10 min. is about 3.5 Kg/25 mm. When an adhesive composition prepared by reacting the same ethylene-vinyl acetate copolymer with 5 wt. % of the unsaturated alkyd resin and 0.05 wt. % of benzoyl peroxide is used, the peeling strength of the laminated aluminum plate is above 18 Kg/25 mm. As can be appreciated, the peeling strength of the present adhesive is substantial.

Having generally described this invention, a further understanding can be obtained by reference to certain specific examples which are provided herein for purposes of illustration only and are not intended to be limiting unless otherwise specified.

In the following examples, the adhesive properties of the adhesives were evaluated by the following method. An adhesive composition was used to prepare a laminated series of an Al plate (0.2 mm), an adhesive composition (0.1 mm), an Al plate (0.2 mm) by compressing the laminate at 150°C for 2 minutes in a heat press machine. The laminated plate was kept at room temperature for 24 hours and a T peeling test was conducted by peeling the layers from each other of a laminate 25 mm. wide at 23°C under a relative humidity of 50% at a rate of 300 mm/min. In the examples, the term "part" means "part by weight".

EXAMPLE 1

99.25 Parts of an ethylene-vinyl acetate copolymer having a vinyl acetate content of 27 wt. % and a melt index of 17 g/10 min, 0.75 part of an unsaturated alkyd resin, and 0.1 part of benzoyl peroxide were mixed on a hot roller mill heated at 100°C for 10 minutes. The mixture was further mixed with 0.2 part of 2,6-di-t-butyl-p-cresol, and it was mixed on the hot roller mill heated at 100°C for 5 minutes to obtain an adhesive composition. The unsaturated alkyd resin was prepared by condensing a mixture of 147 parts of maleic anhydride, 74 parts of phthalic anhydride and 160 parts of propyleneglycol. The product resin had a molecular weight of 1000 and contained 37.5 mole % of maleic anhydride, 12.5 mole % of phthalic anhydride, and 50 mole % of propyleneglycol. The adhesive composition has a melt index of 11.0 g/10 mim. The peeling strength of a laminated aluminum plate bonded with the adhesive composition was 18.5 Kg/25 mm.

EXAMPLE 2

99 Parts of an ethylene vinyl acetate copolymer having a vinyl acetate content of 27 wt. % and a melt index of 17 g/10 min, and 1 part of the unsaturated alkyd resin of Example 1 and 0.1 part of benzoyl peroxide were mixed on a hot roller mill heated at 100°C for 10 minutes. The mixture was further mixed with 0.2 part of 2,6-di-t-butyl-p-cresol for 5 minutes and an adhesive composition was obtained. The melt index of the adhesive composition was 8.9 g/10 min. The peeling strength of a laminated aluminum plate bonded with the adhesive composition was 19.0 Kg/25 mm.

EXAMPLE 3

97 Parts of an ethylene-vinyl acetate copolymer having a vinyl acetate content of 27 wt. % and a melt index of 17 g/10 min., 3 parts of the unsaturated alkyd resin of Example 1 and 0.1 part of benzoyl peroxide were mixed on a hot roller mill heated at 100°C for 10 minutes. The mixture was further mixed with 0.2 part of 2,6-di-t-butyl-p-cresol, for 5 minutes and an adhesive composition having a melt index of 5.6 g/10 min was obtained. The peeling strength of a laminated aluminum plate bonded with the adhesive composition was 19.5 Kg/25 mm.

EXAMPLE 4

92.5 Parts of an ethylene-vinyl acetate copolymer having a vinyl acetate content of 18 wt. % and a melt index of 150 g/10 min, 7.5 parts of the unsaturated alkyd resin of Example 1 and 0.1 part of benzoyl peroxide were mixed on a hot roller mill heated at 100°C for 10 minutes. The mixture was further mixed with 0.2 part of 2,6-di-t-butyl-p-cresol for 5 minutes and an adhesive composition having a melt index of 78 g/10 min was obtained. The peeling strength of a laminated aluminum plate bonded with the adhesive composition was 10.0 Kg/25 mm.

EXAMPLE 5

92.5 Parts of an ethylene-vinyl acetate copolymer having a vinyl acetate content of 27 wt. % and a melt index of 18 g/10 min. 7.5 parts of an unsaturated alkyd resin and 0.1 part of benzoyl peroxide were mixed on a hot roller mill heated at 100°C for 10 minutes. The unsaturated alkyd resin was prepared by condensing a mixture of 98 parts of maleic anhydride, 148 parts of phthalic anhydride and 160 parts of propyleneglycol, and the resin had a molecular weight of 1100 and contained 25 mole % of maleic anhydride, 25 mole % of phthalic anhydride, and 50 mole % of propyleneglycol. The mixture was further mixed with 0.2 of 2,6-di-t-butyl-p-cresol for 5 minutes and an adhesive composition having a melt index of 4.1 g/10 min was obtained. The peeling strength of a laminated aluminum plate bonded with the adhesive composition was 21.0 Kg/25 mm.

EXAMPLE 6

92.5 Parts of an ethylene-vinyl acetate copolymer having a vinyl acetate component of 18 wt. % and a melt index of 150 g/10 min, 7.5 parts of the unsaturated alkyd resin of Example 5 and 0.2 part of benzoyl peroxide were mixed on a hot roller mill heated at 100°C for 10 minutes. The mixture was further blended with 0.2 part of 2,6-di-t-butyl-p-cresol in dry form, and it was extruded through an extruder at 200°C whereby an adhesive composition having a melt index of 106 g/10 min was obtained. The adhesive composition did not deteriorate, even though it was heated at 200°C which is the same as the lamination temperature. The peeling strength of a laminated aluminum plate bonded with the adhesive composition was 9.5 Kg/25 mm.

EXAMPLE 7

95.0 Parts of an ethylene-vinyl acetate copolymer having a vinyl acetate content of 27 wt. % and a melt index of 18 g/10 min, 5.0 parts of the unsaturated alkyd resin of Example 1, and 0.05 part of benzoyl peroxide were mixed on a hot roller mill heated at 100°C for 10 minutes. The mixture was blended with 0.2 part of 2,6-di-t-butyl-p-cresol under dry conditions and it was extruded by an extruder at 100°C whereby a pellet type adhesive composition having a melt index of 16.8 g/10 min was obtained. The peeling strength of a laminated aluminum plate bonded with the adhesive composition was 18.8 Kg/25 mm.

EXAMPLE 8

95.0 Parts of an ethylene-vinyl acetate copolymer having a vinyl acetate content of 18 wt. % and a melt index of 20 g/10 min., 5.0 parts of the unsaturated alkyd resin of Example 1 and 0.1 part of benzoyl peroxide were mixed on a hot roller mill heated at 100°C for 10 minutes. The mixture was blended with 0.2 part of 2,6-di-t-butyl-p-cresol under dry conditions and it was extruded through an extruder at 100°C whereby a pellet type adhesive composition having a melt index of 14.0 g/10 min was obtained. The peeling strength of a laminated aluminum plate bonded with the adhesive composition was 9.0 Kg/25 mm. The pellet type adhesive composition was extruded through an extruder having a diameter of 40 mm at 125°C to form an inflated film having a thickness of 150$\mu$. The peeling strength of a laminated aluminum plate bonded with the inflated film adhesive composition was 10.0 Kg/5 mm.

EXAMPLE 9

92.5 Parts of an ethylene-vinyl acetate copolymer having a vinyl acetate content of 27 wt. % and a melt index of 18 g/10 min, 7.5 parts of the unsaturated alkyd resin of Example 1, and 0.05 part of benzoyl peroxide were mixed on a hot roller mill heated at 100°C for 10 minutes. The mixture was blended with 0.2 part of 2,6-di-t-butyl-p-cresol under dry conditions and it was extruded through an extruder at 100°C to form pellets. The pellets were extruded through an extruder having a diameter of 40 mm at 125°C to form an inflated film having a thickness of 125$\mu$. The peeling strength of a laminated aluminum plate bonded with the inflated film adhesive composition was 15.5 Kg/25 mm.

EXAMPLE 10

80 Parts of an ethylene-vinyl acetate copolymer having a vinyl acetate content of 27 wt. % and a melt index of 170 g/10 min, 20 parts of the unsaturated alkyd resin of Example 1 and 1.0 part of benzoyl peroxide were mixed on a hot roller mill heated at 100°C for 10 minutes. 7.5 Parts of the resulting mixture, 92.5 parts of an ethylene-vinyl acetate copolymer having a vinyl acetate content of 27 wt. % and a melt index of 17 g/10 min. and 0.2 part of 2,6-di-t-butyl-p-cresol were mixed on a hot roller mill heated at 100°C for 5 minutes whereby an adhesive composition having a melt index of 12.2 g/10 min was obtained. The peeling strength of a laminated aluminum plate bonded with the adhesive composition was 18.5 Kg/25 mm.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A hot melt adhesive composition, which comprise of: a modified ethylene-vinylacetate copolymer produced by heating a mixture of 99.7 – 20 parts by weight of an ethylene — vinyl acetate copolymer having a vinyl acetate content of 5–50 wt. % and a melt index of 1–400 g/10 min.; 0.3–80 parts by weight of an unsaturated alkyd resin having a number average molecular weight of 500–5000 produced by esterification of a polyhydric alcohol and an unsaturated dicarboxylic acid or anhydride or a mixture of unsaturated dicarboxylic acid or anhydride with a saturated dicarboxylic acid or anhydride; 0.05–5 parts by weight of an organic peroxide wherein the mixture is heated above the decomposition temperature of the organic peroxide.

2. The hot melt adhesive of claim 1 wherein the polyhydric alcohol is selected from the group consisting of ethyleneglycol, diethyleneglycol, propyleneglycol, dipropyleneglycol, butyleneglycol and hydrogenated bisphenol, the unsaturated dicarboxylic acid or anhydride is selected from the group consisting of maleic anhydride, fumaric acid and itaconic acid and the saturated dicarboxylic acid is selected from the group consisting of phthalic anhydride, isophthalic acid, terephlthalic acid, tetrahydrophthalic anhydride, tetrachlorphthalic anhydride, adipic acid, and sebacic acid.

3. The hot melt adhesive composition of claim 1 wherein the organic peroxide is selected from the group consisting of benzoyl peroxide, lauroyl peroxide, di-t-butyl peroxide, t-butyl perbenzoate and dicumyl peroxide.

4. The hot melt adhesive composition of claim 1, wherein an ethylene-vinyl acetate copolymer is added to said modified ethylene-vinyl acetate copolymer.

5. A film of the hot melt adhesive composition of claim 1.

6. A laminated product having as the adhesive layer the hot melt adhesive composition of claim 1.

* * * * *